United States Patent

Hanrahan et al.

[11] Patent Number: 6,093,306
[45] Date of Patent: Jul. 25, 2000

[54] COMPREHENSIVE SYSTEM FOR UTILITY LOAD LEVELING, HYDROGEN PRODUCTION, STACK GAS CLEANUP, GREENHOUSE GAS ABATEMENT, AND METHANOL SYNTHESIS

[75] Inventors: Robert J. Hanrahan, Gainesville; Robin Z. Parker, Miami, both of Fla.; Harley L. Heaton, Manassas, Va.

[73] Assignee: Solar Reactor Technologies Inc., Miami, Fla.

[21] Appl. No.: 09/100,239

[22] Filed: Jun. 19, 1998

Related U.S. Application Data

[63] Continuation-in-part of application No. 08/835,233, Apr. 7, 1997, Pat. No. 5,833,834.
[51] Int. Cl.[7] .................................. C25B 1/24; C25B 1/02
[52] U.S. Cl. ............................ 205/619; 205/637; 429/19; 423/500; 60/39.5
[58] Field of Search .................................... 205/637, 619; 429/19; 423/500; 60/39.5

[56] References Cited

U.S. PATENT DOCUMENTS 5,219,671  6/1993  Parker et al. .............................. 429/17
5,443,804  8/1995  Parker et al. ............................ 423/230

Primary Examiner—Kishor Mayekar
Attorney, Agent, or Firm—Pillsbury Madison & Sutro LLP

[57] ABSTRACT

A comprehensive energy system is provided in which a fossil fuel-burning electric utility plant is operated in conjunction with a hydrogen production and utility load leveling unit, a $CO_2$ recovery and methanol synthesis unit, and a Bunsen reactor which reacts $Br_2$ and $SO_2$ to from HBr and $H_2SO_4$, while cleaning a utility stack gas.

6 Claims, 7 Drawing Sheets

# COMPREHENSIVE SYSTEM FOR UTILITY LOAD LEVELING, HYDROGEN PRODUCTION, STACK GAS CLEANUP, GREENHOUSE GAS ABATEMENT, AND METHANOL SYNTHESIS

REFERENCE TO RELATED APPLICATION

This application is a continuation-in-part of the U.S. patent application of Hanrahan et at application Ser. No. 08/835,233, filed Apr. 7, 1997, now U.S. Pat. No. 5,833,834, the entire contents of which are incorporated herein by reference.

BACKGROUND OF THE INVENTION

In a typical fossil fuel utility plant, fossil fuel is burned using combustion air, and cooling water, to provide electric power, and, as byproducts, process heat and 'dirty' stack gas which typically includes $CO_2$, $SO_2$, $NO_X$, $H_2O$, $N_2$ and $O_2$. Many electric power generating plants are equipped to clean stack gases, and to recover at least some of the process heat. Where the market for electric power which could be served from the plant varies, e.g. by time of day or seasonally, it has become typical to design and operate the plant to produce some fraction below 1.0, of the marketable power which is neither as small as the minimum load that the system depending on the plant ever experiences, nor as much large as the maximum load experienced, or, with projected growth, could be expected to be experienced in that system.

For dealing with the variable load which is above or below that fraction, different electric power providers employ different strategies. One is to operate additional electric power generating equipment (e.g. as turbine-powered generators) only during peak load periods. Obviously, that solution requires considerable capital investment in facilities which may remain idle much of the time. Another strategy which is popular, is buying power generated by others, and selling to others excess power. This strategy depends on peak loading being out of phase from one generating plant to another. Yet another strategy is pumped storage or some conceptually similar way of putting aside for use during a time of greater demand, some of the electric power that is generated during a time of lesser demand, and vice versa. In that sense, a fossil fueled electric power generating plant and its distribution system, considered as a whole, can be considered to produce excess off-peak electric power, and to have a capability to consume on-peak electric power.

The present invention is concerned with providing a comprehensive energy system which has one or more fossil fueled electric power generating plants as an integral component. Where, in the text and drawings, a 'utility plant' is mentioned, that mention is meant to encompass both a physical reality in which one fossil fueled electric power generating plant is used, and a physical reality in which a plurality of such plants are operated in a coordinated manner.

Hanrahan et al, in U.S. Pat. No. 5,219,671, issued Jun. 15, 1993 have disclosed a steam/bromine/HBr system for hydrogen generation and utility load leveling for a utility plant. A methane-assisted version of such a system is disclosed in the copending U.S. patent application of Hanrahan et al, application Ser. No. 08/835,233, filed Apr. 7, 1997, now U.S. Pat. No. 5,833,834. In both systems, inputs of process heat, water, off-peak power and HBr, are used for providing outputs of $H_2$, $O_2$, $Br_2$ and on-peak electric power. The methane-assisted system has methane as an additional input, and $CO_2$ as an additional output.

The comprehensive energy system of the present invention is intended to incorporate either such system for hydrogen generation and utility load leveling for a utility plant.

The Parker, U.S. Pat. No. 5,443,804, issued Aug. 22, 1995 discloses a system for recovering $CO_2$ from a cleaned utility plant stack gas, and providing an output of liquid methanol, which is useful as an automotive internal combustion engine fuel or fuel ingredient (possibly after some modifications if the engine was designed to run on gasoline).

The comprehensive energy system of the present invention is intended to incorporate such a system for recovery of $CO_2$ and synthesizing methanol.

Lastly, the Mark 13 process, disclosed in a research paper by Van Zelzen et al, and in a 1979 U.K. patent of Van Zelzen et al discloses a system for desulfurizing stack gas and producing hydrogen as an output.

The present invention contemplates operating a Bunsen reactor having some similarities to the Van Zeizen et al system, for cleaning stack gas, converting $Br_2$ to HBr, and producing $H_2SO_4$, and operating such a reactor in conjunction with a utility plant $Br_2$-steam-methane unit, and a $CO_2$ recovery-methanol synthesis unit, for providing a comprehensive energy system.

SUMMARY OF THE INVENTION

A comprehensive energy system is provided in which a fossil fuel-burning electric utility plant is operated in conjunction with a hydrogen production and utility load leveling unit, a $CO_2$ recovery and methanol synthesis unit, and a Bunsen reactor which reacts $Br_2$ and $SO_2$ to form HBr and $H_2SO_4$, while cleaning a utility stack gas.

BRIEF DESCRIPTION OF THE DRAWINGS

A preferred embodiment of the invention is described in further detail with reference to the attached drawings, in which.

DETAILED DESCRIPTION

Figure 1:
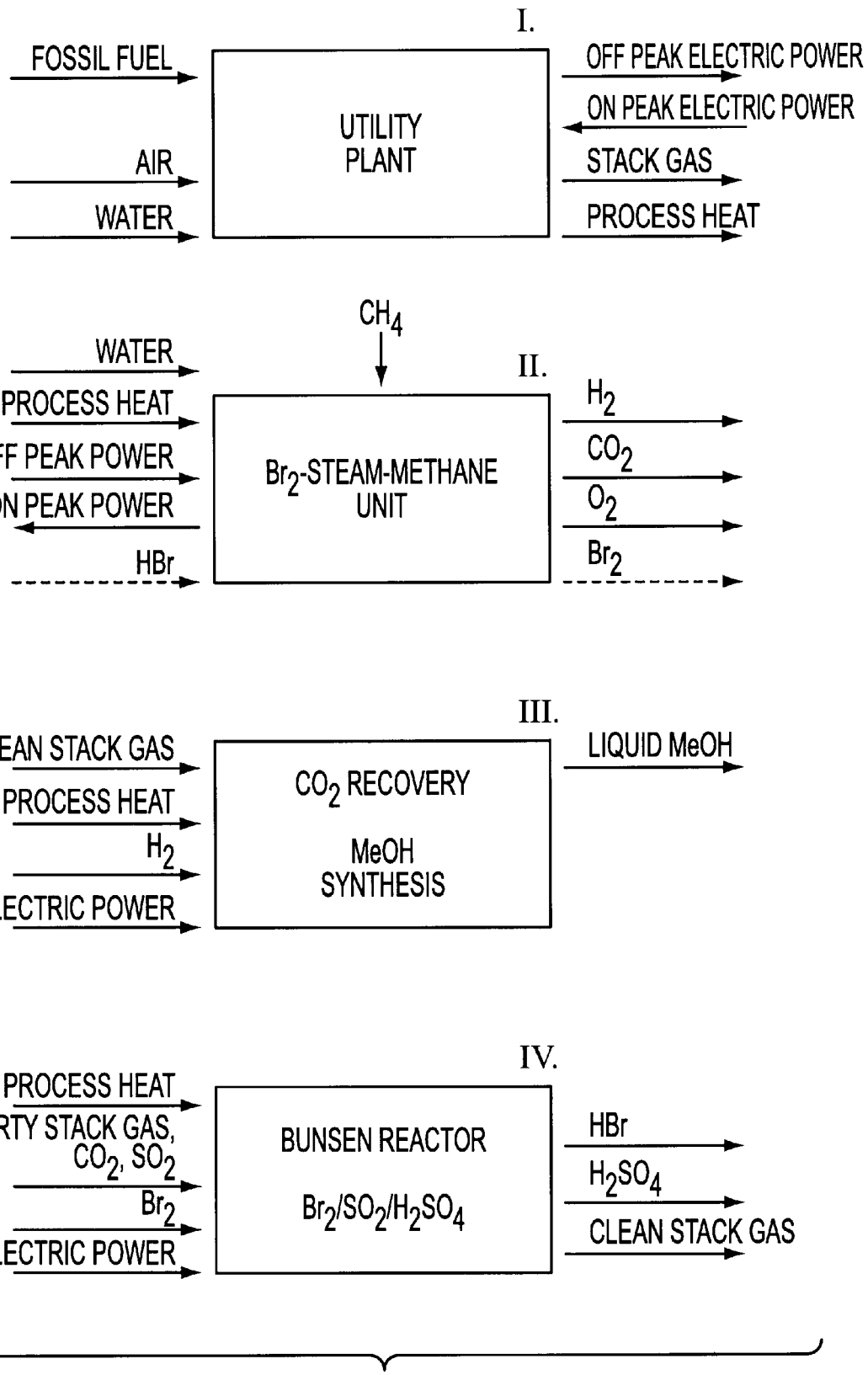
FIG. 1 is a highly schematic representation of the four stages of a comprehensive energy system embodying principles of the present invention, stage to stage interconnections of outputs to inputs having been omitted for simplicity of presentation.

Referring first to FIG. 1, an overall diagram, in four stages, I–IV, is depicted for a preferred embodiment of the comprehensive energy system of the present invention.

Stage I of FIG. 1 schematically depicts a fossil fuel-burning electric power generating facility and its associated components, generally referred to herein as a utility plant.

The utility plant has as principal inputs fossil fuel, combustion air, and cooling water. It is also configured to receive on-peak electric power. The principal outputs of the utility plant are base load electric power, off-peak electric power, process heat and dirty stack gas, containing residual $O_2$, $N_2$, $H_2O$, $CO_2$, $SO_2$ (formed from the sulfur content of the fossil fuel), and $NO_X$.

In use, some of the process heat from Stage I is provided as input to each of Stages II, III and IV, the off-peak electric power is provided as an input to Stage II, on-peak electric power is obtained from Stage II, and the dirty stack gas is cleaned in stage IV to become clean stack gas as an input for stage III. Some electric power for operation is also provided from Stage I to Stages II, III and IV.

Stage II of FIG. 1 schematically depicts a hydrogen generation and load-leveling system for the Stage I utility plant. Two alternative versions are contemplated, the second of which is an elaboration upon the first.

In the first, simpler version of Stage II inputs of water, process heat from Stage I, and off-peak power from Stage I and HBr, are operated on to produce outputs of on-peak power, for distribution by the distribution system of the utility plant of Stage I, $H_2$, $O_2$ and $Br_2$.

In the elaborated version of Stage II, methane, $CH_4$, is an additional input, and $CO_2$ is an additional output. This $CO_2$ can be $CO_2$ added to the $CO_2$ of the clean stack gas output from Stage IV to provide the $CO_2$ content of the clean stack gas input to Stage III.

In the event $CO_2$ production is not desired, the methane-assisted reaction can be accomplished with only the input of heat, electric power, $Br_2$ and $CH_4$, without the input of water, thereby producing HBr and solid carbon. ($2Br_2 + CH_4 \rightarrow 4HBr + C$) Thus, the carbon content of natural gas is sequestered as a solid and is not emitted as a potential greenhouse gas.

Stages II and IV may coordinatingly operate on a fixed inventory of $Br_2$ and HBr.

Stage III of FIG. 1 schematically depicts a $CO_2$ recovery and methanol synthesis unit having as inputs clean stack gas (including $CO_2$) from Stage IV, process heat from Stage I, $H_2$ from Stage II, and electric power from Stage I, and providing liquid methanol, MeOH, as an output, e.g. for use as a motor vehicle internal combustion engine fuel.

Stage IV of FIG. 1 schematically depicts a Bunsen reactor operating on inputs of electric power, process heat and dirty stack gas (containing $CO_2$ and $SO_2$) from Stage I, and $Br_2$ from Stage II to provide as outputs HBr solution for Stage II, clean stack gas (containing $CO_2$) to provide an input for Stage III, and $H_2SO_4$ as a product.

An advantage of the comprehensive energy system including these four stages operated in conjunction with one another is that $CO_2$ greenhouse gases and $SO_x$ produced by the power plant are abated, load-leveling is provided, and hydrogen and methanol (which can be burned or used as fuel in fuel cells for powering vehicles) is produced. Nitrogen oxides abatement can, at least for the present, be accomplished by known means, which are not described in detail herein.

Further details of Stages II, III and IV are described below, respectively with reference to FIG. 2, FIGS. 3 and 4, and FIGS. 5–7.

The apparatus and method of Stage II, and its integration with Stage I may be as shown and described in further detail in the above-identified U.S. patent of Hanrahan et al, 5,219,671, or as shown and described in further detail in the above-identified copending U.S. patent application of Hanrahan et al, application Ser. No. 08/835,233, filed Apr. 7, 1997, now U.S. Pat. No. 5,833,834.

Apparatus and a method for using a utility load-leveling and $H_2$ production unit in conjunction with Stages I, III and IV are further described below with reference to FIG. 2.

Figure 2:
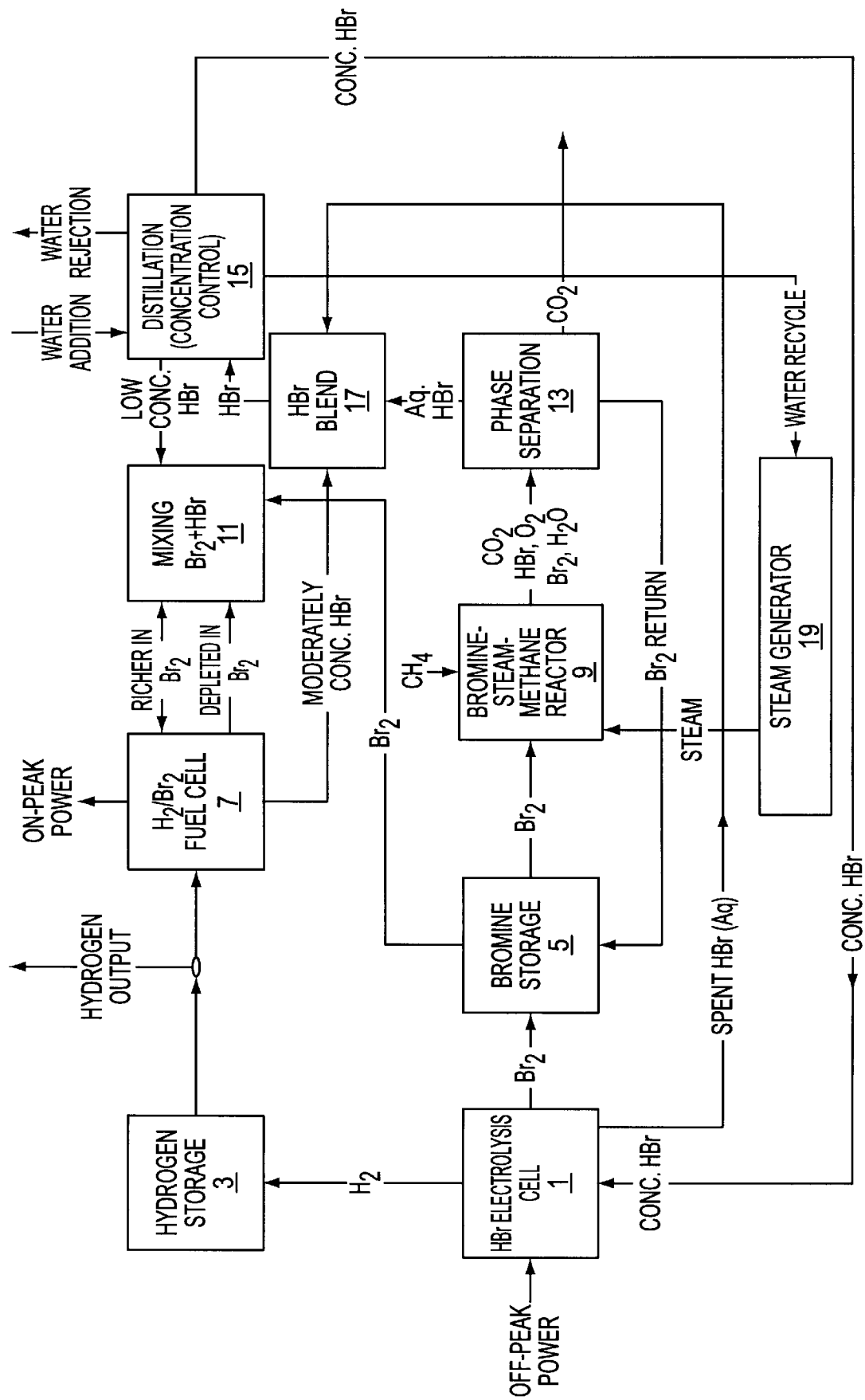
FIG. 2 is a more detailed schematic representation of the second stage of the system shown in FIG. 1.

In Stage II as depicted in FIG. 2, off-peak electric power is employed in electrolysis cell 1, which preferably contains concentrated HBr solution, but could alternatively contain HCl or HI solution. Hydrogen gas produced is stored in vessel 3, and bromine in vessel 5. If desired, for load-leveling purposes, the bromine and hydrogen can be recombined in fuel cell 7.

If it is desired to produce hydrogen, then bromine from storage vessel 5 is combined with steam from steam generator 19 to form HBr in reactor 9. In the particular version of the apparatus shown in FIG. 2, the reaction is enhanced by addition of $CH_4$, which drives the reaction forward by making side product $CO_2$ along with major product HBr. Some reacted $Br_2+H_2O$ may also be included in the output from reactor 9. This mixture is fed to phase separation apparatus 13, where the dense liquid $Br_2$, gaseous $CO_2$, and aqueous HBr solution (saturated with $Br_2$) are respectively produced. The bromine is delivered to storage vessel 5; the $CO_2$ is an output of the system; and the aqueous HBr is fed to a blending/mixing container 17, where HBr and/or HBr–$Br_2$ solutions of various concentrations arrive and are mixed. These include, during different phases of operation, spent HBr from electrolysis cell 1, typically saturated with $Br_2$, HBr solution from the phase separator 13, and HBr solution from fuel cell 7. The blended HBr/$Br_2$ aqueous solution is fed to a distillation/concentration control device 15, wherein concentrated HBr can be produced (from the distillation pot) to feed HBr electrolysis cell 1. Low concentration HBr can be obtained from an intermediate point in the column to supply fuel cell 7 via $Br_2$/HBr mixing/saturation apparatus 11, and water can be added, or rejected, as required at the still head, to maintain the overall water balance in the system. The bromine produced by device 15 can either be fed to mixing unit 11, or returned to bromine storage vessel 5.

For use of the fuel cell, relatively dilute HBr from concentration control equipment 15 is delivered to mixing apparatus 11, wherein sufficient bromine is added as required from storage vessel 5 (or distillation equipment 15) to saturate the HBr which is delivered to the fuel cell. An HBr/$Br_2$ solution can be circulated as required between fuel cell 7 and bromine saturating unit 11, to maintain the concentration of $Br_2$ in fuel cell 7. Bromine concentration in that apparatus is diminished as the $H_2$/$Br_2$ combination reaction occurs electrochemically. The required hydrogen for operation of the fuel cell is obtained from storage vessel 3. In order to maintain the required liquid level and HBr concentration in fuel cell 7, moderately concentrated HBr is withdrawn and delivered to blender 17, to balance net introduction of dilute HBr from subsystem 15 via subsystem 11.

Note that the $Br_2$ product can be removed from HBr electrolysis cell 1 either as concentrated liquid bromine, or as spent HBr solution saturated with bromine. The ratio of these two outputs will depend on operating parameters, particularly the temperature of cell 1 and the net flow rate of concentrated HBr into cell 1 and spent HBr out of cell 1.

With respect to the operation of the Bunsen reactor of Stage IV, described below, fresh bromine can be withdrawn as required from storage vessel 5, and HBr produced by the Bunsen reactor can be delivered to the HBr blend system 17.

The apparatus and method of Stage III, and its integration with Stage I may be as shown and described in further detail in the above-identified Parker, U.S. Pat. No. 5,443,804.

Further details are provided below, with reference to FIGS. 3 and 4, for clarifying the interrelationship of Stage III with Stages I, II and IV.

Combustion gases from the fossil fuel utility plant of Stage I are at least partially cleaned by removal of $SO_2$ gas in Stage IV, further described below. The moderately warm cleaned stack gas so-obtained, which is primarily constituted by a mixture of $CO_2$, $H_2O$, and $N_2$ is directed to a $CO_2$ absorption system consisting of several beds of an appropriate metal oxide, typically magnesium oxide, equipped with appropriate valving as shown in FIG. 3. As the trapping system is utilized, the beds are constituted primarily of dry metal oxide, hydrated metal oxide/metal hydroxide, the just mentioned bed of metal oxide/metal hydroxide partially converted to metal carbonate, and finally a substantially dry bed of metal oxide/metal carbonate from which $CO_2$ is being eluted. This sequence of operations can be understood in connection with FIG. 3.

Figure 3:
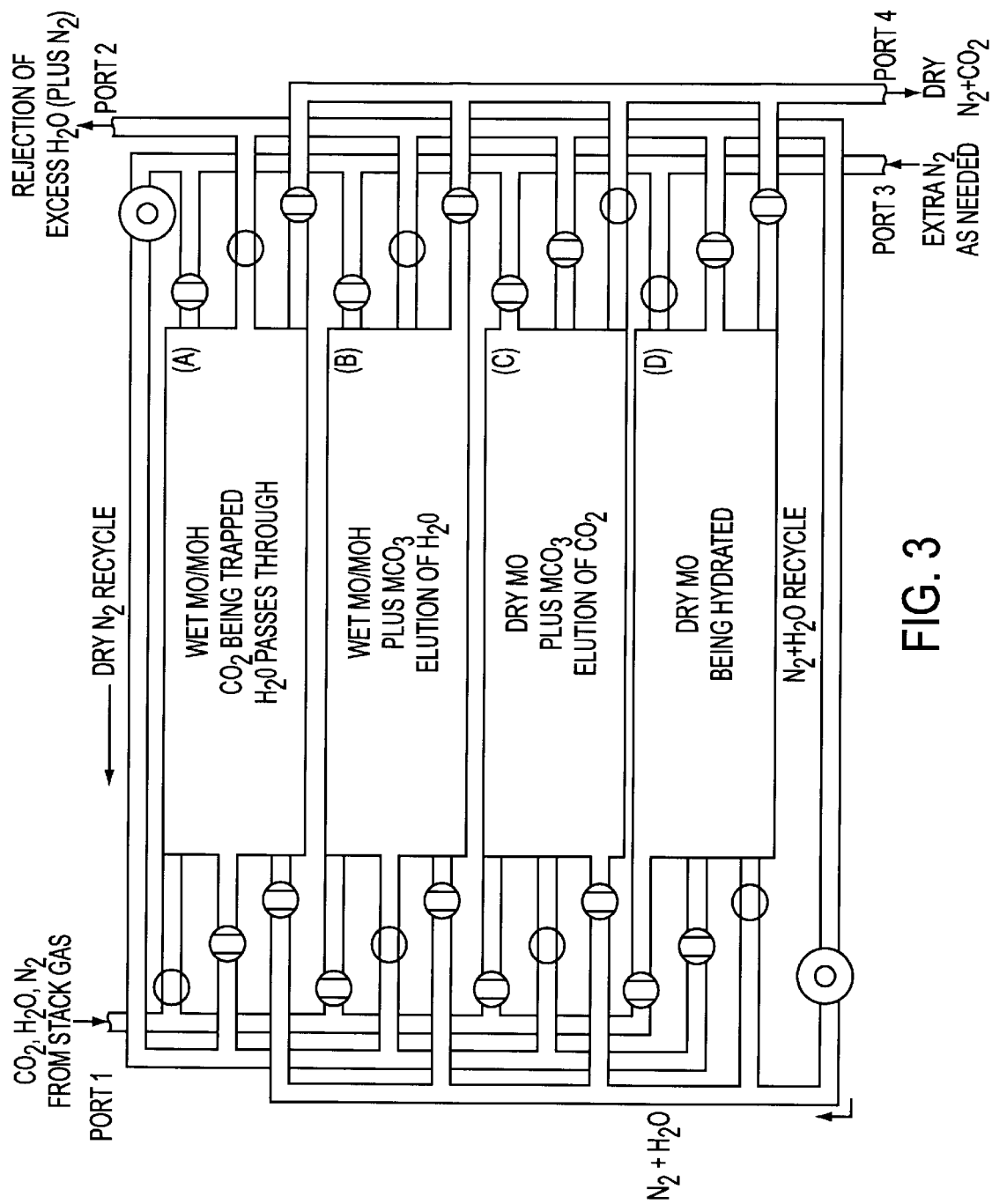
FIG. 3 is a more detailed schematic representation of the third stage of the system shown in FIG. 1.
Figure 4:
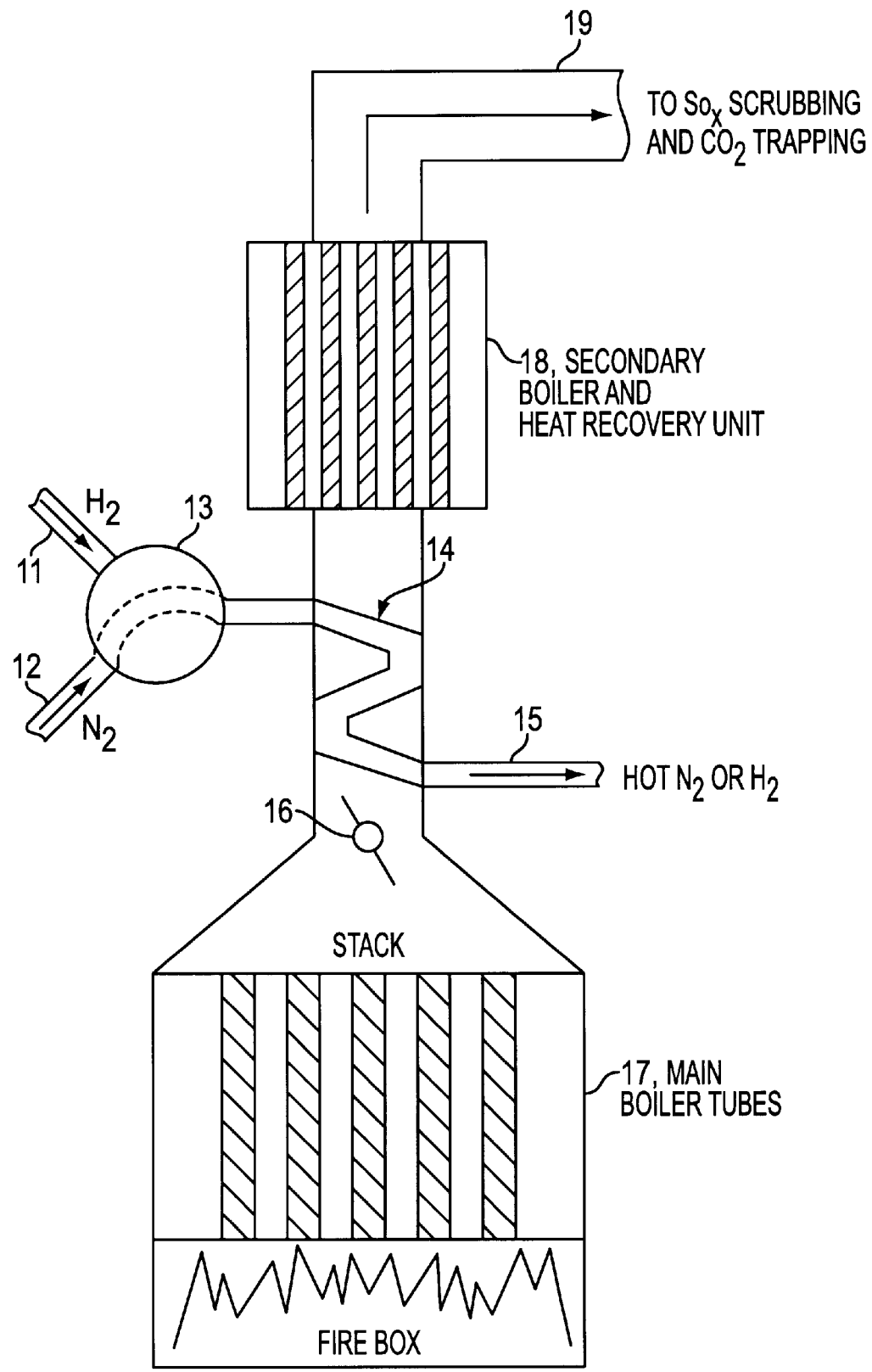
FIG. 4 is a schematic representation of a possible elaboration of the third stage of the system shown in FIGS. 1 and 3.

During the period of time illustrated FIG. 3, stack gas from which $SO_2$ has been removed is directed into absorber bed A, consisting of moist metal oxide/metal hydroxide, wherein the $CO_2$ is removed from the gas and fixed (reversibly) as solid in the form of metal carbonate. The resulting moist mixture of water and $N_2$ vapors is redirected to previously dried metal oxide bed, which served to remove the water content. This gas is then heated via a heat exchange system installed in the stack gas system of the associated utility plant, and then redirected to beds B and C to cause elution of absorbed gases. Bed B, maintained at a somewhat lower temperature, initially elutes $H_2O$, leaving a mixture of metal oxide and metal carbonate behind. Since the effluent of the bed during that phase of operation contains a mixture of $N_2$ and $H_2O$, it is combined with a gas of similar content exiting bed A, and used for hydration of bed B.

In bed C, the $H_2O$ content has already been eliminated. A continuing flow of dry $N_2$, at a somewhat higher temperature as necessary, serves to elute $CO_2$ which is then delivered as a mixture of dry $N_2$ plus $CO_2$ to the methanol synthesis apparatus, as described in Parker et al U.S. Pat. No. 5,443, 804. It will be perceived that the work assignment of the various beds is rotated in a cyclical fashion. That is, by the time bed A is saturated with $CO_2$, bed D will be sufficiently hydrated to take over the job of $CO_2$ trapping. At that point, dry nitrogen is directed at bed A for elution of water, additional nitrogen at a somewhat higher temperature is directed to bed B (which has now been freed of water) to elute $CO_2$. Bed C, which by this time has been freed of both water and $CO_2$, is rehydrated to take on the role of primary absorption bed. Thus it is seen that functionally, the role of bed A shifts to bed B, B shifts to C, C shifts to D, and D shifts to A. This process can be continued indefinitely as required.

$CO_2$, $H_2O$, and $N_2$ are continuously supplied to Stage III from the stack gas of the associated Stage I utility plant, whereas $N_2$ plus $CO_2$ are directed toward the methanol synthesis apparatus of Stage IV. Excess $H_2O$ plus some $N_2$ can be rejected from port 2 as convenient. Additional $N_2$ can be added to maintain required gas flow.

It will be understood that the physical measurements of the trapping bed such as length, diameter, volume, and mass of metal oxide contained will be matched to the volume of $CO_2$ produced per unit time from the associated utility plant of Stage I. Additionally, if it is necessary to process larger quantities of stack gas, then additional beds, with gas flow plumbing as already described, can be added to Stage III.

As already mentioned, dry, hot nitrogen is needed in two of the four stages of operation of Stage III described above, namely elution of $H_2O$, and subsequent elution of $CO_2$. Some of the $N_2$ requirements can be met during the time period when the dry metal oxide bed which had been freed of both $H_2O$ and $CO_2$ is being rehydrated; the output during most of this process is dry nitrogen which can be reused. However, it is anticipated that this would not be a sufficient supply for the overall process. It will be noted that two beds are being swept by dry nitrogen (for elution of $H_2O$ and $CO_2$, respectively) at any given time, whereas dry nitrogen is available from only one bed. Accordingly, there needs to be a supply of hot, dry $N_2$. This can be obtained from a flume installed in the furnace stack of the utility plant of Stage I or whatever other facility from which the stack gas derives, as shown in FIG. 4. (FIG. 4 shows the possibility of obtaining either hot $H_2$ or $N_2$ from the apparatus. In connection with the $CO_2$ trapping equipment, only dry $N_2$ is needed. However, hot, dry $H_2$ is required for conversion of $CO_2$ to methanol, as described in Parker et al U.S. Pat. No. 5,443, 804.)

Apparatus and a method of operation for Stage IV is further described below, with particular reference to FIGS. 1 and 5–7.

Figure 5:
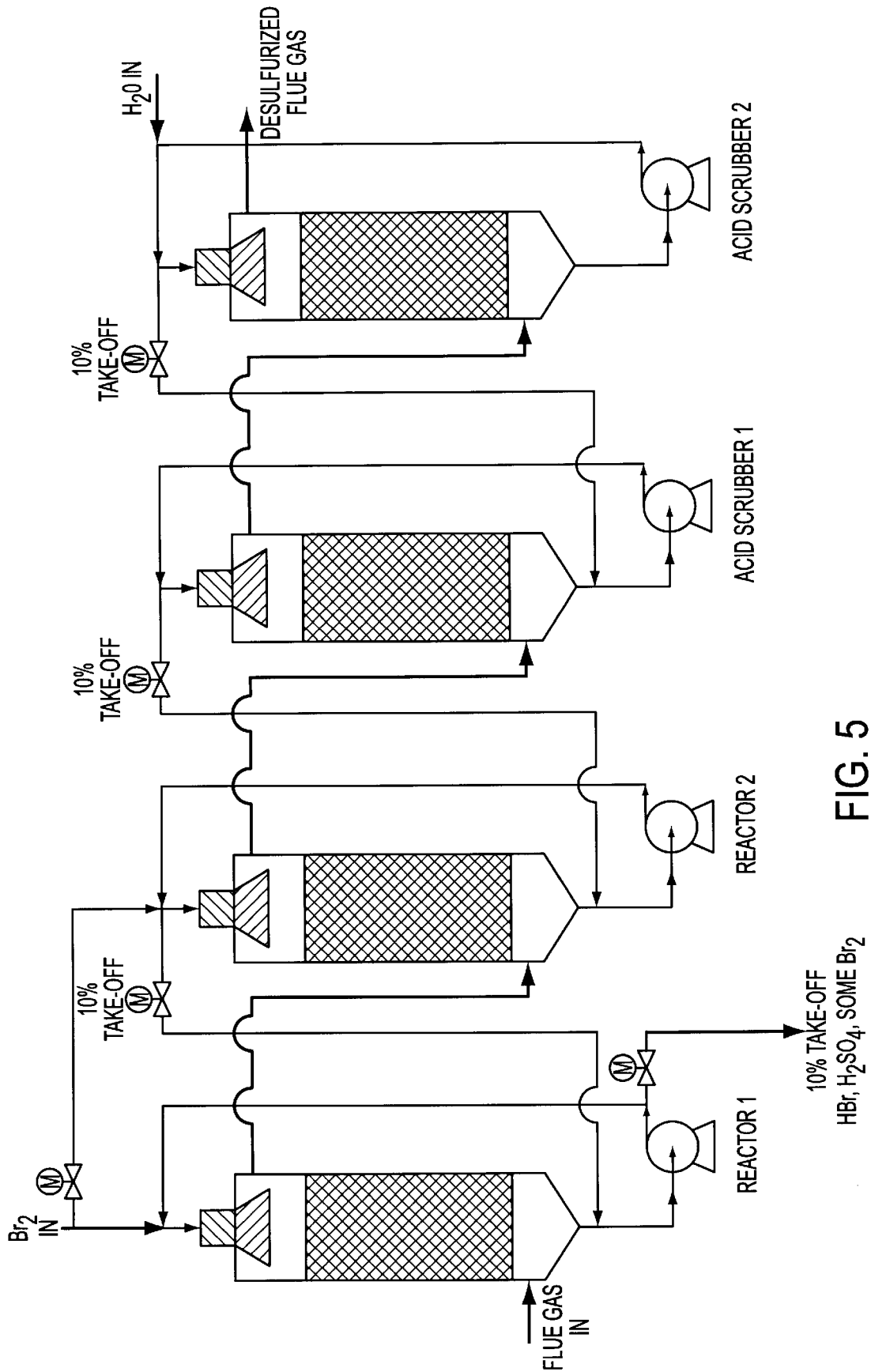
FIGS. 5–7 are schematic representations of the fourth stage of the system shown in FIG. 1.

In Stage IV, dirty stack gas from the utility plant of Stage I, previously cooled by heat exchangers or other means to approximately 100° C., is directed to the first stage of a multiple stage reactor/gas washing apparatus, shown in FIG. 5. Each stage consists of apparatus for introducing the stack gas stream, later venting the stream, and passing it through a column of glass helices, raschig rings, or other convenient shapes constructed of glass or ceramic, designed to furnish a large surface area whereby the gas can flow over and around liquid surface films of a reactant/washing solution. In the first and second stages (or optionally, more stages if required) of this Stage IV apparatus bromine liquid or gas is introduced at the top of the column. Furthermore, each column is bathed with a liquid solution, most of which is pumped from a sump at the bottom of the column to a spray head at the top. Thus, in traversing the packing, the gas is intimately contacted with an aqueous solution which contains bromine, in the case of the first two or three columns.

In these same columns the $SO_2$ from the incoming dirty stack gas is converted to HBr according to the following reaction:

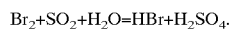

$$Br_2 + SO_2 + H_2O = HBr + H_2SO_4.$$

This is known in the literature as the Bunsen reaction. As a result of this reaction, the liquid collecting in the sump of the first column, after a period of operation, is a moderately concentrated mixture of aqueous $H_2SO_4$ in HBr, containing also traces of bromine. Approximately 90% of the liquid in the sump is drawn off for recirculation through the spray head at the top, while 10% is directed to a separate apparatus (FIG. 6, discussed below) where $H_2SO_4$ is concentrated, and a mixture of water, HBr, and $Br_2$ is driven off. The product HBr (containing a little excess $Br_2$) is returned to the concentration control/distillation subunit of Stage II, described earlier.

The stack gas exiting reactor 1 enters reactor 2, where it is again bathed in a solution recirculated from the sump at the bottom. In this reactor, and in an additional reactor (not shown), if desired, small additional amounts of $Br_2$ are added to remove any remaining $SO_2$ via the previously mentioned reaction. Approximately 90% of the liquid collection in the sump of reactor 2 is redirected to the spray head at the top, and the remaining 10% is directed to mingle with the fluid entering the spray at the top of reactor 1. It is desirable to provide real time spectrophotometric analysis for $Br_2$ vapor in reactors 2 (and the additional reactor, if provided), using a simple filter spectrometer. The amount of bromine added to reactor 2 (and optionally, in the third reactor, if provided) is monitored so as to quantitatively consume all remaining $SO_2$.

The Bunsen reaction does not require an especially high temperature; about 100° C. is adequate in the reactor 1. Accordingly, the hot, dirty stack gas is initially cooled via a heat exchanger, simultaneously re-warming the $N_2/CO_2$ mixture which is sent onward to the $CO_2$ trapping Stage III.

Figure 6:
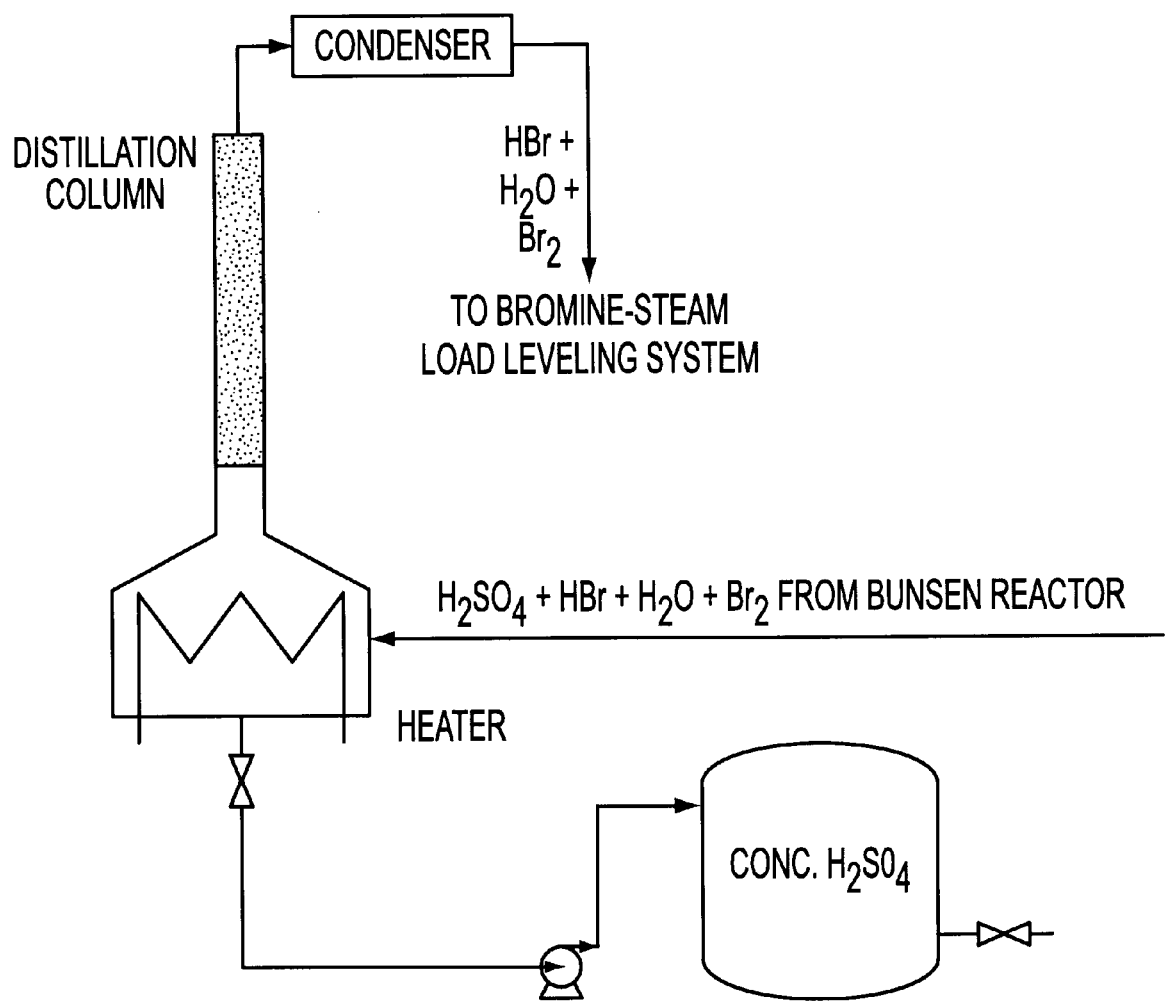

As mentioned above, approximately ten percent of the liquid collecting in the sump of scrubber I is directed to a distillation apparatus for sulfuric acid purification. The sump liquid is a mixture of sulfuric acid, aqueous HBr, and bromine. These are conveniently separated by distillation, as shown in FIG. 6. Depending upon requirements of the overall system, a mixture of aqueous $HB_r+Br_2$ can be taken off at the still head, and clean, concentrated sulfuric acid can be taken from the distillation pot. Alternatively, if desired, nearly pure $Br_2$ can be taken off at the still head, and a solution of $HBr+Br_2$ (containing also a small amount of $Br_2$) can be taken off at an intermediate point in the still. The sulfuric acid obtained from this process is available for use or sale.

Figure 7:
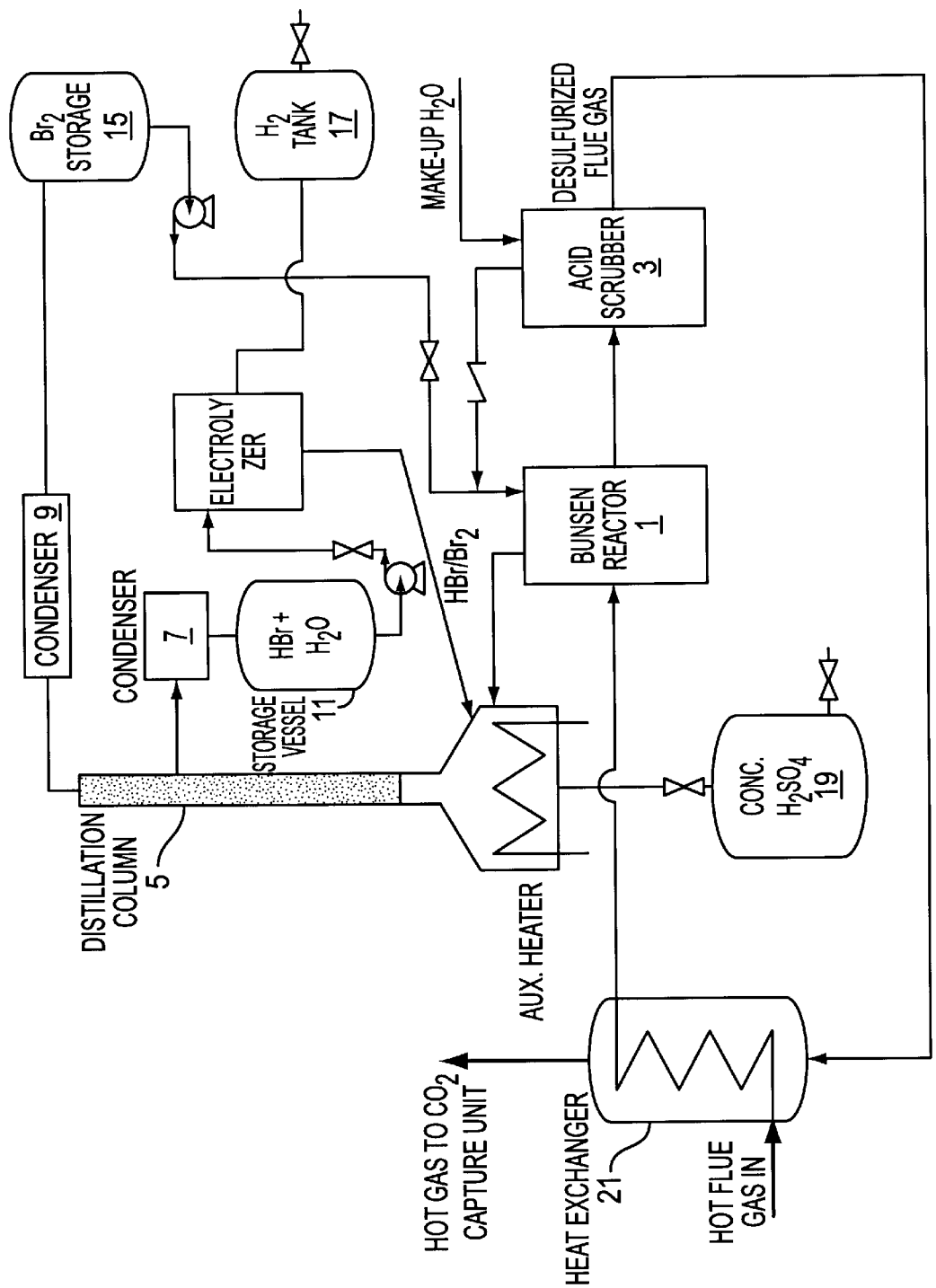

FIG. 7 shows integration of the $SO_2$-scrubbing equipment and sulfuric acid distillation apparatus of Stage IV with other components of the load leveling and hydrogen generation of Stage II, described earlier. Hot flue gas enters via heat exchanger 21 and is directed toward Bunsen reactor 1 (two or three stages). The resulting flue gas, now free of $SO_2$, is purified by water scrubbing, unit 3 in the drawing. The resulting desulfurized flue gas is reheated by heat exchanger 21 and directed to the $CO_2$ trapping equipment described earlier.

The sulfuric acid produced by the Bunsen reactor 1 is purified in distillation column 5, and the $H_2SO_4$ solution so produced is stored in vessel 19. As previously mentioned, bromine can be separated at the top of the still, passing via condenser 9 to bromine storage vessel 15. HBr aqueous solution is obtained at a lower point in the still, cooled by condenser 7, and directed to storage vessel 11, from which it is pumped to the electrolyzer for reformations of bromine and production of $H_2$ (stored in tank 17) for commercial sale or use in methanol production. Condensers 7 and 9 are shown separately for clarity; in practice they would be integral parts of the distillation apparatus.

$H_2$ produced by electrolyzing HBr in the system can be sold. Otherwise, $H_2$ available for sale is limited to the amount which is stoichiometrically equivalent to the $SO_2$ in the dirty stack gas.

Although Stages II and IV have been illustrated as being physically distinct units, in practice it is likely to be advantageous to provide a combined facility carrying out the functions of both Stage II and Stage IV, and to perform most of the $HBr/Br_2$ separation and concentration work in a separate facility, as is illustrated in FIG. 2.

It should now be apparent that the comprehensive system for utility load leveling, hydrogen production, stack gas cleanup, greenhouse gas abatement, and methanol synthesis as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A comprehensive energy system, comprising:
   a utility plant arranged to process fossil fuel, combustion air and cooling water, provided as inputs, to produce base load electric power, off-peak electric power, $SO_2$-containing stack gas, and process heat as outputs, and to accept as an input for distribution, on-peak electric power;
   a $Br_2$-steam-methane unit arranged to receive as inputs water, process heat from said utility plant, off-peak power from said utility plant and HBr, to produce said on-peak power for input to said utility plant, $H_2$, $O_2$ and $Br_2$;
   a $CO_2$ recovery and methanol synthesis unit arranged to receive as inputs stack gas from said utility plant, after cleaning of $SO_2$ from that stack gas, process heat from said utility plant, $H_2$ from said $Br_2$-steam-methane unit and electric power from said utility plant, to produce methanol as an output; and
   a Bunsen reactor arranged to receive as inputs process heat from said utility plant, $SO_2$-containing stack gas from said utility plant, $Br_2$ from said $Br_2$-steam-methane unit, and electric power from said utility plant, to produce HBr provided as input to said $Br_2$-steam-methane unit, $H_2SO_4$, and $CO_2$-containing stack gas, depleted of $SO_2$ and provided as input to said $CO_2$ recovery and methanol synthesis unit.

2. The comprehensive energy system of claim 1, wherein: said $Br_2$-steam-methane unit is further arranged to receive $CH_4$ as an input and to provide $CO_2$ as an output, for combination with said $CO_2$-containing stack gas, depleted of $SO_2$, provided as an input to said $CO_2$ recovery and methanol synthesis unit.

3. A comprehensive energy system, comprising:
   a utility plant arranged to process fossil fuel, combustion air and cooling water, provided as inputs, to produce base load electric power, off-peak electric power, $SO_2$-containing stack gas, and process heat as outputs, and to accept as an input for distribution, on-peak electric power;
   a $Br_2$-methane unit arranged to receive as inputs, process heat from said utility plant, off-peak power from said utility plant, and $CH_4$ to react with $Br_2$, to produce said on-peak power for input to said utility plant, solid carbon, and HBr, and wherein the HBr is further electrolyzed to produce $H_2$ and $Br_2$;
   a $CO_2$ recovery and methanol synthesis unit arranged to receive as inputs stack gas from said utility plant, after cleaning of $SO_2$ from that stack gas, process heat from said utility plant, $H_2$ from said $Br_2$-methane unit and electric power from said utility plant, to produce methanol as an output; and
   a Bunsen reactor arranged to receive as inputs process heat from said utility plant, $SO_2$-containing stack gas from said utility plant, $Br_2$ from said $Br_2$-methane unit, and electric power from said utility plant, to produce HBr provided to said $Br_2$-methane unit, $H_2SO_4$, and $CO_2$-containing stack gas, depleted of $SO_2$ and provided as input to said $CO_2$ recovery and methanol synthesis unit.

4. A comprehensive method for utility load-leveling, hydrogen production, stack gas clean-up, greenhouse gas abatement, $H_2SO_4$ production and methanol synthesis, comprising:
   processing in a utility plant fossil fuel, combustion air and cooling water, provided as inputs, to produce base load electric power, off-peak electric power, $SO_2$-containing stack gas, and process heat as outputs, and to accept as an input for distribution, on-peak electric power;
   receiving in a $Br_2$-steam-methane unit as inputs water, process heat from said utility plant, off-peak power from said utility plant and HBr, to produce said on-peak power for input to said utility plant, $H_2$, $O_2$ and $Br_2$;

receiving in a $CO_2$ recovery and methanol synthesis unit as inputs stack gas from said utility plant, after cleaning of $SO_2$ from that stack gas, process heat from said utility plant, $H_2$ from said $Br_2$-steam-methane unit and electric power from said utility plant, to produce methanol as an output; and receiving in a Bunsen reactor as inputs process heat from said utility plant, $SO_2$-containing stack gas from said utility plant, $Br_2$ from said $Br_2$-steam-methane unit, and electric power from said utility plant, to produce HBr provided as input to said $Br_2$-steam-methane unit, $H_2SO_4$, and $CO_2$-containing stack gas, depleted of $SO_2$ and provided as input to said $CO_2$ recovery and methanol synthesis unit.

5. The comprehensive method of claim 4, further comprising:

receiving in said $Br_2$-steam-methane unit $CH_4$ as an input and to provide $CO_2$ as an output, for combination with said $CO_2$-containing stack gas, depleted of $SO_2$, provided as in input to said $CO_2$ recovery and methanol synthesis unit.

6. A comprehensive method for utility load-leveling, hydrogen production, stack gas clean-up, greenhouse gas abatement, $H_2SO_4$ production and methanol synthesis, comprising:

processing in a utility plant fossil fuel, combustion air and cooling water, provided as inputs, to produce base load electric power, off-peak electric power, $SO_2$-containing stack gas, and process heat as outputs, and to accept as an input for distribution, on-peak electric power;

receiving in a $Br_2$-methane unit as inputs, process heat from said utility plant, off-peak power from said utility plant, and $CH_4$ to react with $Br_2$, to produce said on-peak power for input to said utility plant, solid carbon, and HBr, and wherein the HBr is further electrolyzed to produce $H_2$ and $Br_2$;

receiving in a $CO_2$ recovery and methanol synthesis unit as inputs stack gas from said utility plant, after cleaning of $SO_2$ from that stack gas, process heat from said utility plant, $H_2$ from said $Br_2$-methane unit and electric power from said utility plant, to produce methanol as an output; and receiving in a Bunsen reactor as inputs process heat from said utility plant, $SO_2$-containing stack gas from said utility plant, $Br_2$ from said $Br_2$-methane unit, and electric power from said utility plant, to produce HBr provided to said $Br_2$-methane unit, $H_2SO_4$, and $CO_2$-containing stack gas, depleted of $SO_2$ and provided as input to said $CO_2$ recovery and methanol synthesis unit.

* * * * *